(12) United States Patent
Chan

(10) Patent No.: US 9,582,322 B2
(45) Date of Patent: Feb. 28, 2017

(54) METHOD AND APPARATUS TO AVOID DEADLOCK DURING INSTRUCTION SCHEDULING USING DYNAMIC PORT REMAPPING

(71) Applicant: Soft Machines, Inc., Santa Clara, CA (US)

(72) Inventor: Nelson N. Chan, Folsom, CA (US)

(73) Assignee: SOFT MACHINES INC., Santa Clara, CA (US)

( * ) Notice: Subject to any disclaimer, the term of this patent is extended or adjusted under 35 U.S.C. 154(b) by 189 days.

(21) Appl. No.: 14/101,615

(22) Filed: Dec. 10, 2013

(65) Prior Publication Data

US 2014/0282575 A1    Sep. 18, 2014

Related U.S. Application Data

(60) Provisional application No. 61/793,541, filed on Mar. 15, 2013.

(51) Int. Cl.
*G06F 9/46* (2006.01)
*G06F 7/38* (2006.01)
(Continued)

(52) U.S. Cl.
CPC .......... *G06F 9/4881* (2013.01); *G06F 9/3012* (2013.01); *G06F 9/3824* (2013.01); *G06F 9/3836* (2013.01); *G06F 9/3891* (2013.01)

(58) Field of Classification Search
None
See application file for complete search history.

(56) References Cited

U.S. PATENT DOCUMENTS 5,053,952 A   10/1991   Koopman, Jr. et al.
5,386,583 A    1/1995   Hendricks
(Continued)

FOREIGN PATENT DOCUMENTS

CN   1841314   10/2006
EP   0638183    3/1997
(Continued)

OTHER PUBLICATIONS

Zhou Li, Fast Interconnect Synthesis With Layer Assignment. Apr. 2008 (Cited by Examiner Jun. 9, 2016).
(Continued)

*Primary Examiner* — Bing Zhao

(57) ABSTRACT

A method for performing dynamic port remapping during instruction scheduling in an out of order microprocessor is disclosed. The method comprises selecting and dispatching a plurality of instructions from a plurality of select ports in a scheduler module in first clock cycle. Next, it comprises determining if a first physical register file unit has capacity to support instructions dispatched in the first clock cycle. Further, it comprises supplying a response back to logic circuitry between the plurality of select ports and a plurality of execution ports, wherein the logic circuitry is operable to re-map select ports in the scheduler module to execution ports based on the response. Finally, responsive to a determination that the first physical register file unit is full, the method comprises re-mapping at least one select port connecting with an execution unit in the first physical register file unit to a second physical register file unit.

20 Claims, 8 Drawing Sheets

(51) Int. Cl.
*G06F 9/48* (2006.01)
*G06F 9/38* (2006.01)
*G06F 9/30* (2006.01)

(56) References Cited

U.S. PATENT DOCUMENTS

| | | | |
|---|---|---|---|
| 5,651,124 A | 7/1997 | Shen et al. |
| 5,729,766 A | 3/1998 | Cohen |
| 5,751,982 A | 5/1998 | Morley |
| 5,784,638 A | 7/1998 | Goetz et al. |
| 5,826,055 A | 10/1998 | Wang et al. |
| 5,826,073 A | 10/1998 | Ben-Meir et al. |
| 5,870,575 A | 2/1999 | Kahle et al. |
| 5,870,584 A | 2/1999 | Bennett |
| 5,905,876 A | 5/1999 | Pawlowski et al. |
| 5,983,335 A | 11/1999 | Dwyer, III |
| 6,049,868 A | 4/2000 | Panwar |
| 6,052,777 A | 4/2000 | Panwar |
| 6,061,785 A | 5/2000 | Chiarot et al. |
| 6,167,508 A | 12/2000 | Farrell et al. |
| 6,269,439 B1 | 7/2001 | Hanaki |
| 6,360,311 B1 | 3/2002 | Zandveld et al. |
| 6,385,676 B1 | 5/2002 | Adkisson |
| 6,557,095 B1 | 4/2003 | Henstrom |
| 6,711,672 B1 | 3/2004 | Agesen |
| 6,779,092 B2 | 8/2004 | Watts |
| 6,813,704 B1 | 11/2004 | Nguyen |
| 6,851,011 B2 | 2/2005 | Lin |
| 6,898,699 B2 | 5/2005 | Jourdan et al. |
| 7,096,345 B1 | 8/2006 | Chen et al. |
| 7,113,510 B2 | 9/2006 | Lin |
| 7,127,592 B2 | 10/2006 | Abraham et al. |
| 7,170,814 B2 | 1/2007 | Morikawa |
| 7,315,935 B1 | 1/2008 | Alsup et al. |
| 7,373,637 B2 | 5/2008 | DeWitt, Jr. et al. |
| 7,434,031 B1 | 10/2008 | Spracklen et al. |
| 7,644,210 B1 | 1/2010 | Banning et al. |
| 7,710,763 B2 | 5/2010 | Houston |
| 7,716,460 B2 | 5/2010 | Stempel et al. |
| 7,721,076 B2 | 5/2010 | Sodani et al. |
| 7,783,869 B2 | 8/2010 | Grandou et al. |
| 7,813,163 B2 | 10/2010 | Pille et al. |
| 8,024,522 B1 | 9/2011 | Favor et al. |
| 8,074,060 B2 | 12/2011 | Col et al. |
| 8,219,784 B2 | 7/2012 | Ban et al. |
| 8,238,192 B2 | 8/2012 | Nii |
| 8,959,094 B2 | 2/2015 | Taylor |
| 2002/0032852 A1 | 3/2002 | Ramirez et al. |
| 2003/0101444 A1 | 5/2003 | Wu et al. |
| 2003/0163671 A1 | 8/2003 | Gschwind et al. |
| 2004/0133766 A1 | 7/2004 | Abraham et al. |
| 2006/0026408 A1 | 2/2006 | Morris et al. |
| 2006/0242365 A1 | 10/2006 | Ali et al. |
| 2007/0186081 A1 | 8/2007 | Chaudhry et al. |
| 2007/0192541 A1 | 8/2007 | Balasubramonian et al. |
| 2008/0028195 A1 | 1/2008 | Kissell et al. |
| 2008/0126771 A1 | 5/2008 | Chen et al. |
| 2008/0216073 A1 | 9/2008 | Yates et al. |
| 2009/0019261 A1 | 1/2009 | Nguyen et al. |
| 2009/0049279 A1 | 2/2009 | Steiss et al. |
| 2009/0103377 A1 | 4/2009 | Chang |
| 2009/0164766 A1 | 6/2009 | Suggs et al. |
| 2009/0182987 A1 | 7/2009 | Mejdrich et al. |
| 2009/0210627 A1 | 8/2009 | Alexander et al. |
| 2009/0254709 A1 | 10/2009 | Agesen |
| 2010/0064287 A1 | 3/2010 | Bull et al. |
| 2010/0097840 A1 | 4/2010 | Kim |
| 2010/0131742 A1 | 5/2010 | Col et al. |
| 2010/0153690 A1 | 6/2010 | Vick et al. |
| 2010/0161948 A1 | 6/2010 | Abdallah |
| 2010/0299671 A1 | 11/2010 | Kinsey |
| 2011/0016292 A1 | 1/2011 | McDonald et al. |
| 2011/0271055 A1 | 11/2011 | O'Connor |
| 2011/0320784 A1 | 12/2011 | Almog et al. |
| 2012/0117335 A1 | 5/2012 | Bryant |
| 2012/0198157 A1 | 8/2012 | Abdallah |
| 2012/0221747 A1 | 8/2012 | Mei et al. |
| 2012/0246450 A1 | 9/2012 | Abdallah |
| 2013/0086365 A1* | 4/2013 | Gschwind ............ G06F 9/30072 712/220 |
| 2014/0126278 A1 | 5/2014 | Nii et al. |
| 2014/0281116 A1 | 9/2014 | Abdallah et al. |
| 2014/0281388 A1 | 9/2014 | Abdallah |
| 2014/0281422 A1 | 9/2014 | Abdallah et al. |
| 2014/0282546 A1 | 9/2014 | Abdallah et al. |
| 2014/0304492 A1 | 10/2014 | Abdallah et al. |
| 2015/0023086 A1 | 1/2015 | Wendell |
| 2015/0324213 A1 | 11/2015 | Abdallah et al. |

FOREIGN PATENT DOCUMENTS

| | | |
|---|---|---|
| TW | 200719216 | 5/2007 |
| TW | I329437 | 8/2010 |
| TW | I368165 | 7/2012 |
| TW | I377502 | 11/2012 |
| WO | WO9737301 | 10/1997 |

OTHER PUBLICATIONS

Michael Slater, Microprocessor Report, The Insiders' Guide to Microprocessor Hardware Oct. 1994, vol. 8 (Cited by Examiner Jun. 9, 2016).

* cited by examiner

METHOD AND APPARATUS TO AVOID DEADLOCK DURING INSTRUCTION SCHEDULING USING DYNAMIC PORT REMAPPING

CROSS REFERENCE TO RELATED APPLICATIONS

This application is a conversion of and claims priority to and the benefit of Provisional Patent Application No. 61/793,541, entitled "METHOD AND APPARATUS TO AVOID DEADLOCK DURING INSTRUCTION SCHEDULING USING DYNAMIC PORT REMAPPING," having a filing Date of Mar. 15, 2013, which is herein incorporated by reference in its entirety.

FIELD OF THE INVENTION

Embodiments according to the present invention generally relate to microprocessor architecture and more particularly to the architecture for out-of-order microprocessors.

BACKGROUND OF THE INVENTION

In an Out-Of-Order ("OOO") microprocessor, instructions are allowed to issue and execute out of their program order. The instructions in an OOO microprocessor execute out of order while still preserving data dependence constraints. Because instructions may finish in an arbitrary order, the architectural register file in an OOO processor pipeline cannot be modified by the instructions as they finish because it would make it difficult to restore their values accurately in the event of an exception or an interrupt. Hence, every instruction that enters the pipeline is provided a temporary entry in a physical register file where it can save its result. The temporary entries in the physical register file are eventually written into the architectural register file in program order when the instructions "retire."

The write back module in a conventional OOO microarchitecture will write the resulting values from instructions being executed out of order back to the physical register file in the re-order buffer (ROB) first. The ROB keeps track of the program order in which instructions entered the pipeline and for each of these instructions, the ROB maintains temporary register storage in the physical register file. When the oldest instructions in the ROB produce a valid result, those instructions can be safely committed. That is, the results of those instructions can be made permanent since there is no earlier instruction that can raise a mispredict or exception that may undo the effect of those instructions. When instructions are ready to be committed, the ROB will move the corresponding values in the physical register file for those instructions to the architectural register file so the instructions can retire. Therefore, through the ROB's in-order commit process, the results in the architectural register file are made permanent and architecturally visible.

Certain conventional distributed OOO processor designs make use of distributed physical register files. Distributing physical register files into two or more units reduces the area and routing that is typically required for a single unit. In a distributed design, execution ports are tied to discrete physical register file units. For example, FIG. 1 illustrates a block diagram for a conventional distributed design with two wings, wherein the physical register file is distributed over the two wings. As shown in FIG. 1, Wing 0 110 comprises Execution Unit 0 106, Architectural Register File 0 104, and Physical Register File 0 108, while Wing 1 130 comprises Execution Unit 1 122, Architectural Register File 1 120, and Physical Register File 1 124.

As instructions are issued from the Issue Queue (not shown) within Scheduler 172, they are executed by an execution unit within one of the wings. The instruction then writes its output to a respective physical register file and, as the instruction retires, its register destination is moved to a respective architectural register file. For example, an instruction that is executed in Execution Unit 0 106 writes its register output to Physical Register File 0 108. As the instruction retires, its register destination is moved to Architectural Register File 0 104.

FIG. 2 illustrates a block diagram showing a static mapping technique used in conventional distributed designs for pairing select ports in a scheduler with execution ports in an execution unit of an OOO processor. The scheduler in a conventional OOO processor selects and dispatches multiple instructions per cycle with static ordering. For example, in FIG. 2, scheduler 272 can select 4 instructions through select port 0 204, select port 1 206, select port 2 220, and select port 3 222 based on age order. Accordingly, the oldest or most high priority instruction will be selected by select port 0 204. The select ports shown in FIG. 2 and other figures, also comprise select logic used to pick the appropriate instructions. It should be noted that while the example of FIG. 2 selects only 4 instructions, a typical scheduler can have any number of select ports to select instructions.

The select ports of the conventional OOO processor illustrated in FIG. 2 are tied with specific execution ports. Accordingly, select port 0 204 is tied to execution unit port 0 208, select port 1 206 is tied to execution unit port 2 212, select port 2 220 is tied to execution unit port 1 210, and select port 3 222 is tied to execution unit port 3 214. Execution unit port 0 208 and execution unit port 1 210 are part of Execution Unit 0 232, which write their output to Physical Register File 0 281, which in turn drains into Architectural Register File 0 280. Similarly, execution unit port 2 212 and execution unit port 3 214 write their output to Physical Register File 1 284, which in turn drains into Architectural Register File 1 283.

As shown in FIG. 2, select port 1 206 connects to execution unit port 2 212 in Wing 1 230, while select port 2 220 connects to execution unit port 1 210 in Wing 0 210. The ports are cross-linked as shown in FIG. 2 in order to load balance between Wing 0 and Wing 1. If, for example, there are only two ready instructions in a given cycle that are selected by the first two select ports, select port 0 204 and select port 1 206, instead of routing both instructions to Execution Unit 0 232, the load between Wing 0 and Wing 1 is balanced by sending one instruction to execution unit port 0 and the other instruction to execution unit port 2. Select port 0 will typically pick the oldest or most high priority instruction and the remaining ports will pick instructions in order of decreasing age.

Due to timing constraints in conventional complex scheduler design, select units and execution ports are statically mapped as shown in FIG. 2. In the illustrated design, for example, select port 0 204 is tied to execution unit port 0 208.

However, a problem arises in conventional designs such as the one illustrated in FIG. 1 when Physical Register File 0 281 is full while the oldest instruction in the scheduler is yet to be executed. In an OOO machine where instructions are executed in OOO fashion, retirement of instructions has to be done in-order to maintain the program order. Because the oldest instruction is not yet executed, Scheduler 272 cannot retire any younger instructions and, therefore, the Physical Register File 0 281 cannot be drained to Architectural Register File 0 280. Meanwhile, Scheduler 272 cannot dispatch the oldest instruction because the select unit used to pick the oldest instruction is statically tied to execution unit port 0 208 in Wing 0 210.

Under the best circumstances, this results in inefficiency and will affect performance, while in the worst circumstances, it may cause a deadlock. If a deadlock results, a flush of the entire pipeline is required to recuperate. Instructions are accordingly flushed out of Scheduler 272 and Physical Register File 0 281 and dispatched again. However, the same deadlock condition could arise again when instructions are re-dispatched and, therefore, statically mapping select ports and execution ports can be problematic.

One conventional technique that has been used to address the problem of deadlock is illustrated in FIG. 3. FIG. 3 illustrates a block diagram showing a technique used in conventional distributed designs for pairing select ports in a scheduler with execution ports in an execution unit of an OOO processor wherein the scheduler is split into two blocks. The scheduler in FIG. 3 is split into Scheduler Block A 372 and Scheduler Block B 373. Select port 0 304 and select port 1 306 select and dispatch instructions from Scheduler Block A to Execution Unit 0 306 while select port 2 320 and select port 3 322 select and dispatch instructions from Scheduler Block B to Execution Unit 1 307. Execution Unit 0 306 writes its output to Physical Register File 0 308, which in turn drains its output to Architectural Register File 0 304. Similarly Execution Unit 1 307 writes its output to Physical Register File 1 324, which in turn drains its output to Architectural Register File 1 320.

The design illustrated in FIG. 3 addresses the problem of deadlock because each of the scheduler blocks has the same number of entries as the corresponding physical register file. For example, Scheduler Block A 372 has the same number of entries as Physical Register File 0 308. Therefore, there is no way that a physical register file will be full if there are still undispatched entries in the corresponding scheduler block. Stated differently, the physical register file will always have room for any undispatched instructions from a corresponding scheduler block.

Even though deadlock is prevented, the design in FIG. 3 unfortunately still results in some inefficiency. For example, if Scheduler Block A 372 has 5 ready instructions that the select ports have to choose from while Scheduler Block B 373 only has 1 ready instruction, it results in a reduction in the dispatch rate. For example, select port 0 304 and select port 1 306 can only pick 2 of the 5 ready instructions for dispatch at a time. Meanwhile, the select ports in Scheduler Block B 373 are not fully utilized because there is only 1 ready instruction in Scheduler Block B. Accordingly, an extra cycle will be required to execute all 5 ready instructions in Scheduler Block A 372 than if the instructions could have been distributed evenly between the two blocks. Hence, the dispatch rate suffers.

Conventional processor techniques of tying scheduler select ports statically to execution units, therefore, are problematic because they can either result in deadlock or load imbalance between different units of the physical register file.

BRIEF SUMMARY OF THE INVENTION

Accordingly, a need exists for a method and apparatus that can avoid deadlock during instruction scheduling by utilizing a dynamic port mapping scheme. Further, a need exists for a method and apparatus that can balance loads equally between units of a distributed physical register file through a dynamic port mapping scheme.

In one embodiment, to solve the deadlock and load imbalance issues, a virtual port and port renaming technique is introduced in the scheduler of an OOO processor. The select ports in a scheduler are tied to virtual execution ports rather than a physical execution port. In the event that a particular register file corresponding to an execution unit is full, the select ports advantageously can be remapped to different virtual execution ports that route the instructions to an execution unit corresponding to a physical register unit that is not full.

A method for performing dynamic port remapping during instruction scheduling in an out of order microprocessor is disclosed. The method comprises selecting and dispatching a plurality of instructions from a plurality of select ports in a scheduler module in first clock cycle. Next, it comprises determining if a first physical register file unit has capacity to support instructions dispatched in the first clock cycle. Further, it comprises supplying a response back to logic circuitry coupled between the plurality of select ports and a plurality of execution ports, wherein the logic circuitry is operable to re-map select ports in the scheduler module to execution ports based on the response. Finally, responsive to a determination that the first physical register file unit is full, the method comprises re-mapping at least one select port connecting with an execution unit in the first physical register file unit to a second physical register file unit.

In a different embodiment, an out of order processor configured to perform a method for performing dynamic port remapping during instruction scheduling is disclosed. The method comprises selecting and dispatching a plurality of instructions from a plurality of select ports in a scheduler module in first clock cycle. Next, it comprises determining if a first physical register file unit has capacity to support instructions dispatched in the first clock cycle. Further, it comprises supplying a response back to logic circuitry coupled between the plurality of select ports and a plurality of execution ports, wherein the logic circuitry is operable to re-map select ports in the scheduler module to execution ports based on the response. Finally, responsive to a determination that the first physical register file unit is full, the method comprises re-mapping at least one select port connecting with an execution unit in the first physical register file unit to a second physical register file unit, wherein the second physical register unit has capacity to support an instruction dispatched from the at least one select port.

In another embodiment, an apparatus for performing dynamic port remapping during instruction scheduling in an out of order microprocessor is disclosed. The apparatus comprises a memory and a processor communicatively coupled to the memory, wherein the processor is configured to process instructions out of order, and further wherein the processor is configured to: (a) select and dispatch a plurality of instructions from a plurality of select ports in a scheduler module in a first clock cycle; (b) determine if a first physical register file unit has capacity to support instructions dispatched in the first clock cycle; (c) supply a response regarding a determination of whether the first physical register file unit has capacity to logic circuitry coupled between the plurality of select ports and a plurality of execution ports, wherein the logic circuitry is operable to re-map select ports in the scheduler module to execution ports based on the response; and (d) responsive to a determination that the first physical register file unit is full, re-map at least one select port connecting with an execution unit in the first physical register file to a second physical register file unit, wherein the second physical register file unit has capacity to support an instruction dispatched from the at least one select port.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
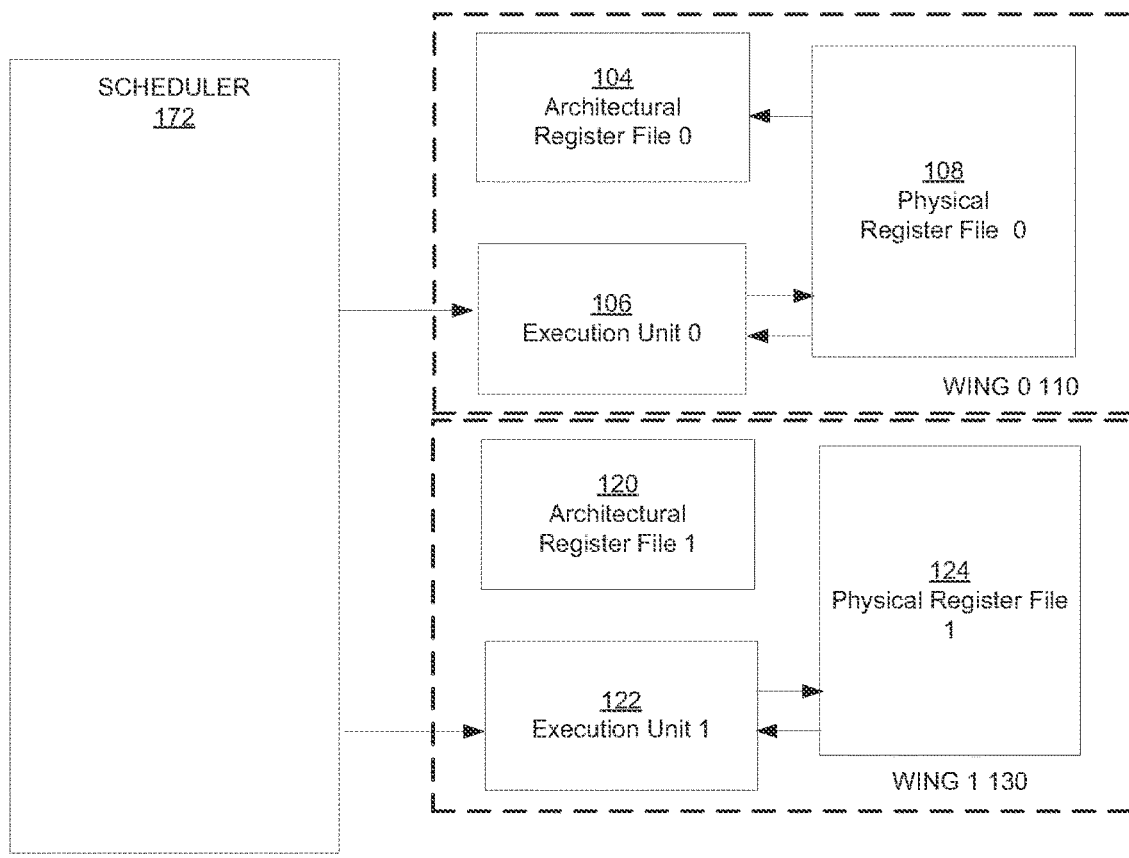
FIG. 1 illustrates a block diagram for a conventional distributed design with two wings, wherein the physical register file is distributed over the two wings.
Figure 2:
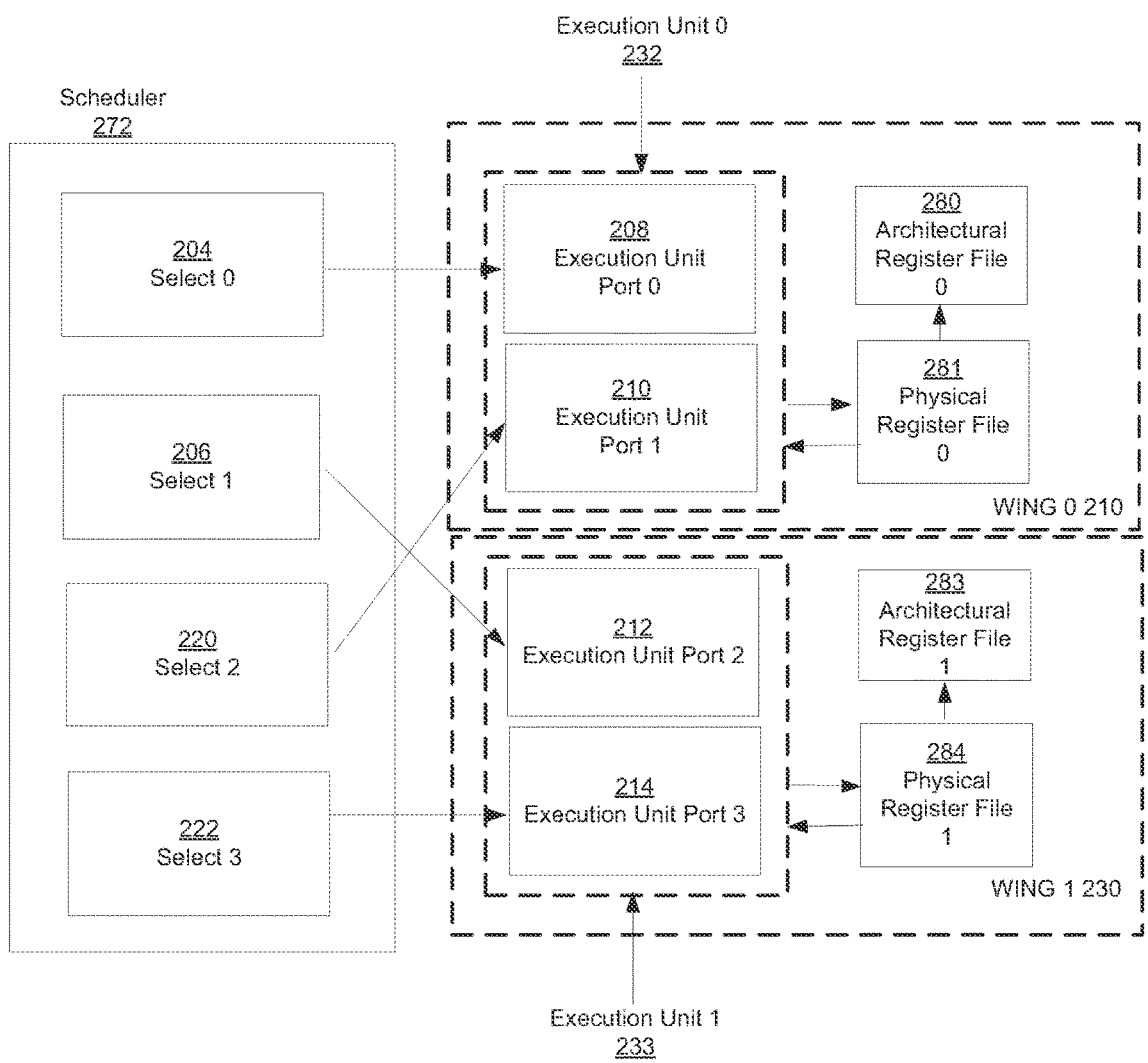
FIG. 2 illustrates a block diagram showing a static mapping technique used in conventional distributed designs for pairing select ports in a scheduler with execution ports in an execution unit of an OOO processor.
Figure 3:
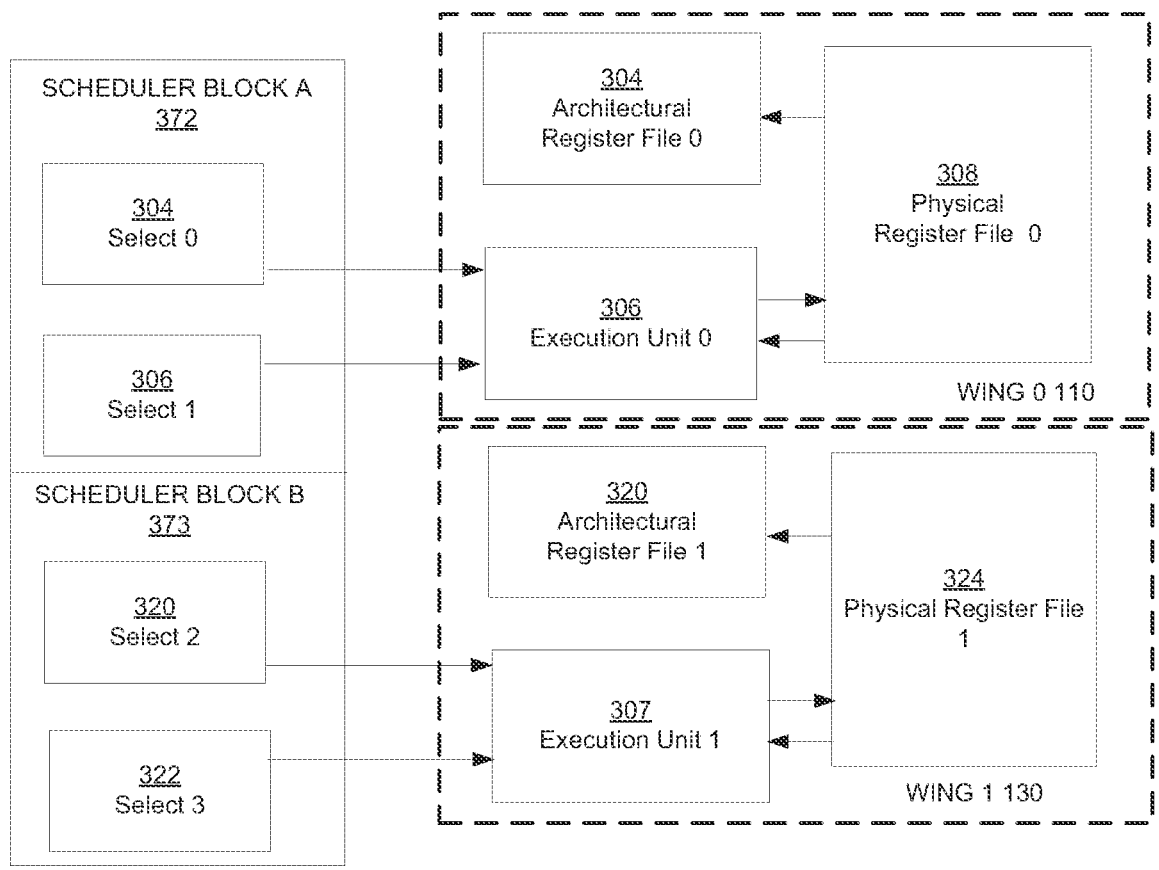
FIG. 3 illustrates a block diagram showing a technique used in conventional distributed designs for pairing select ports in a scheduler with execution ports in an execution unit of an OOO processor wherein the scheduler is split into two blocks

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.
Notation and Nomenclature Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "selecting," "determining," "re-mapping," and "feeding," or the like, refer to actions and processes (e.g., flowchart 800 of FIG. 8) of a computer system or similar electronic computing device or processor (e.g., system 410 of FIG. 4). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 4:
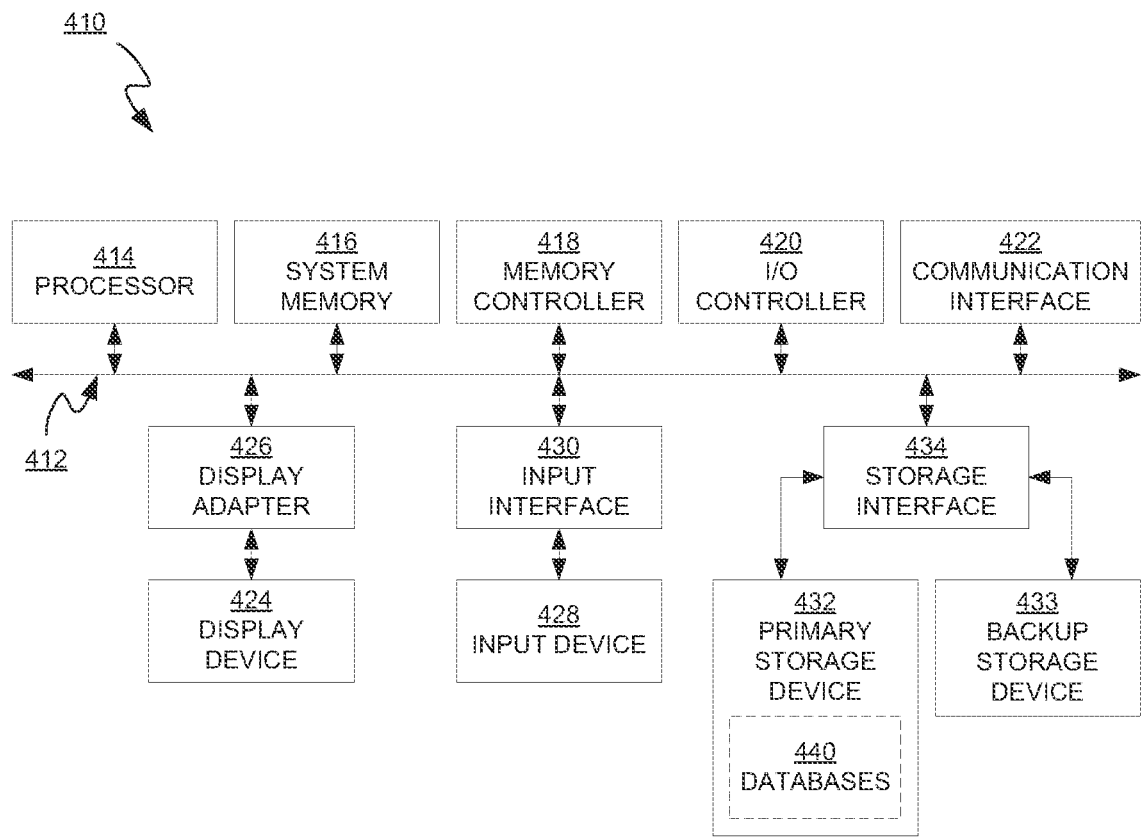
FIG. 4 is an exemplary computer system in accordance with embodiments of the present invention.

FIG. 4 is a block diagram of an example of a computing system 410 capable of being integrated with a processor 414 of an embodiment of the present disclosure. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 of an embodiment of the present invention and a system memory 416.

Processor 414 incorporates embodiments of the present invention and generally represents any type or form of processing unit capable of processing data or interpreting and executing instructions. In certain embodiments, processor 414 may receive instructions from a software application or module. These instructions may cause processor 414 to perform the functions of one or more of the example embodiments described and/or illustrated herein. In one embodiment, processor 414 may be an out of order microprocessor. In a different embodiment, processor 414 may be a superscalar processor. In yet another embodiment, processor 414 may comprise multiple processors operating in parallel.

System memory 416 generally represents any type or form of volatile or non-volatile storage device or medium capable of storing data and/or other computer-readable instructions. Examples of system memory 416 include, without limitation, RAM, ROM, flash memory, or any other suitable memory device. Although not required, in certain embodiments computing system 410 may include both a volatile memory unit (such as, for example, system memory 416) and a non-volatile storage device (such as, for example, primary storage device 432).

Computing system 410 may also include one or more components or elements in addition to processor 414 and system memory 416. For example, in the embodiment of FIG. 4, computing system 410 includes a memory controller 418, an input/output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between example computing system 410 and one or more additional devices. For example, communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In one embodiment, communication interface 422 provides a direct connection to a remote server via a direct link to a network, such as the Internet. Communication interface 422 may also indirectly provide such a connection through any other suitable connection.

Communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data for display on display device 424.

As illustrated in FIG. 4, computing system 410 may also include at least one input device 428 coupled to communication infrastructure 412 via an input interface 430. Input device 428 generally represents any type or form of input device capable of providing input, either computer- or human-generated, to computing system 410. Examples of input device 428 include, without limitation, a keyboard, a pointing device, a speech recognition device, or any other input device.

As illustrated in FIG. 4, computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In one example, databases 440 may be stored in primary storage device 432. Databases 440 may represent portions of a single database or computing device or it may represent multiple databases or computing devices. For example, databases 440 may represent (be stored on) a portion of computing system 410. Alternatively, databases 440 may represent (be stored on) one or more physically separate devices capable of being accessed by a computing device, such as computing system 410.

Continuing with reference to FIG. 4, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be separate devices accessed through other interface systems.

Many other devices or subsystems may be connected to computing system 410. Conversely, all of the components and devices illustrated in FIG. 4 need not be present to practice the embodiments described herein. The devices and subsystems referenced above may also be interconnected in different ways from that shown in FIG. 4. Computing system 410 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of the example embodiments described and/or illustrated herein. Additionally or alternatively, the example embodiments described and/or illustrated herein may be implemented in firmware and/or hardware.

Method and Apparatus to Avoid Deadlock During Instruction Scheduling Using Dynamic Port Remapping Embodiments of the present invention provide a method and apparatus that effectively avoids deadlock during instruction scheduling by utilizing a dynamic port mapping scheme. Further embodiments of the present invention provide for a method and apparatus that can balance loads equally between units of a distributed physical register file through the dynamic port mapping scheme.

In one embodiment of the present invention, to solve the deadlock and load imbalance issues, a virtual port and port remapping technique is introduced in the scheduler of an OOO processor. It is appreciated that the select ports in the scheduler are tied to virtual execution ports rather than a physical execution port. In the event that a particular register file corresponding to an execution unit is full, the select ports can advantageously be remapped to different virtual execution ports that route the instructions to an execution unit corresponding to a physical register unit that is not full. Thus, the embodiments of the present invention advantageously avoid deadlock and can also distribute the load evenly between different units of a physical register file.

Figure 5:
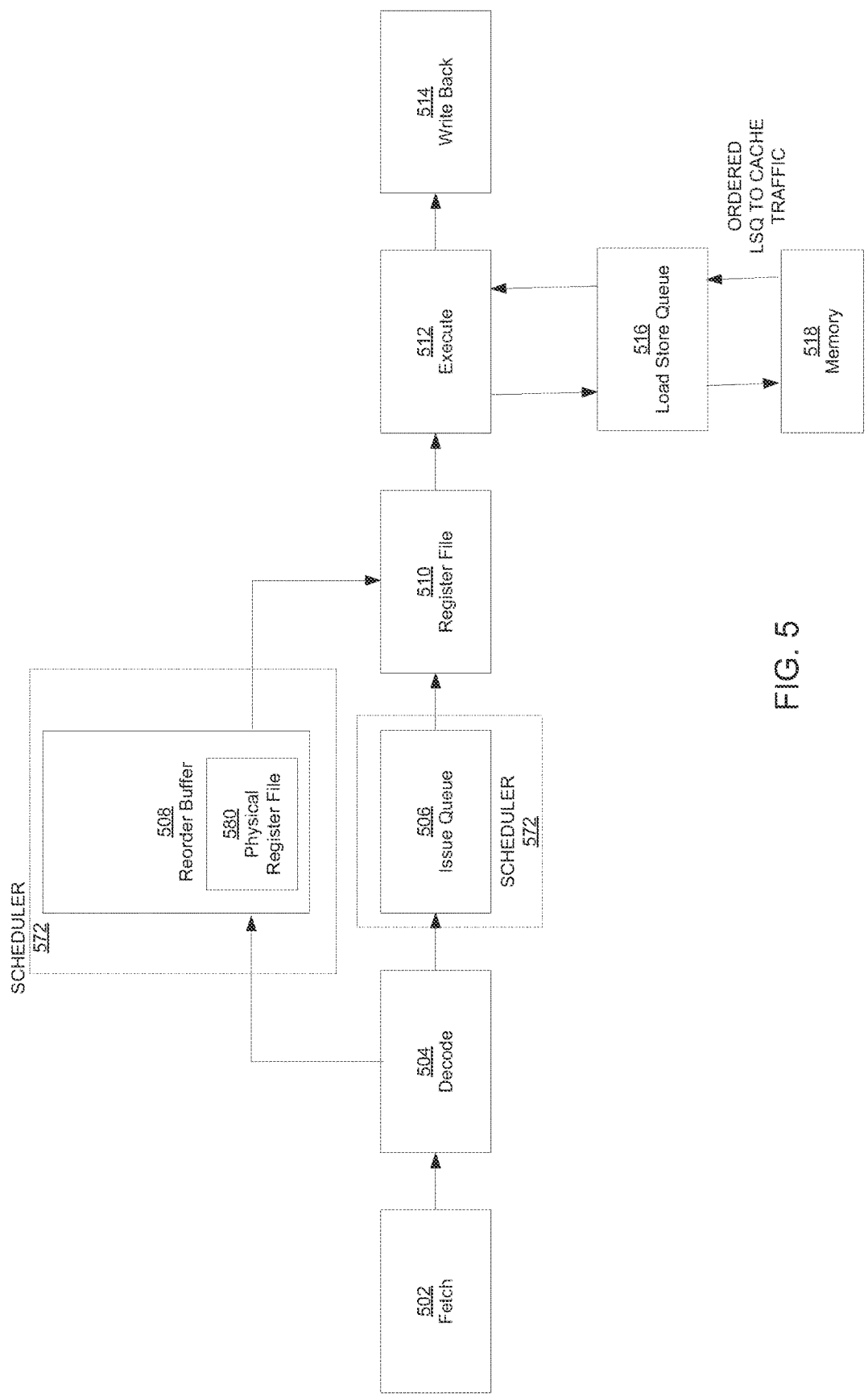
FIG. 5 is an exemplary diagram of a pipeline for an out of order microprocessor on which embodiments of the present invention can be implemented in accordance with one embodiment of the present invention.

FIG. 5 is an exemplary diagram of a pipeline for an out of order microprocessor on which embodiments of the present invention can be implemented in accordance with one embodiment of the present invention.

As illustrated in FIG. 5, instructions are fetched at the fetch stage 502 and place in the instruction fetch queue (IFQ) (not shown) within the fetch stage 502. These instructions reference the architectural registers, which are stored in register file 510. After the instructions are dispatched from the fetch unit 502, they are decoded by decode module 504 and are placed in the ROB 508 and issue queue 506 (IQ). In one embodiment of the present invention, the scheduler module 572 comprises the ROB 508 and IQ 506. As instructions are issued out of IQ 506 out of order using scheduler module 572, they are executed by execute module 512.

The write back module 514, in one embodiment, can write the resulting values from those instructions back to the temporary registers in ROB 508 first. The ROB 508 keeps track of the program order in which instructions entered the pipeline and for each of these instructions, the ROB maintains temporary register storage in physical register file 580. The physical register file, in one embodiment of the present invention, is allocated dynamically as instructions are dispatched from the scheduler. Because the physical register file is allocated as the instructions are dispatched, it is not in age order. The physical register file stores out of order entries and waits for them to be retired in order to the architectural register file 510.

In one embodiment, the physical register file 580 can be distributed into two or more units. Further, in one embodiment, the total number of entries in the various units of the physical register file equal the number of entries in the scheduler 572 because the number of alive instructions in the scheduler need to do also reside in the physical register file if they are selected and dispatched in one cycle.

When the oldest instructions in the ROB produce a valid result, those instructions can be safely committed. That is, the results of those instructions can be made permanent since there is no earlier instruction that can raise a mispredict or exception that may undo the effect of those instructions. When instructions are ready to be committed, the ROB 508 will move the corresponding values in the temporary registers for those instructions to the architectural register file 510. Therefore, through the ROB's in-order commit process, the results in the register file 510 are made permanent and architecturally visible.

The instructions issued out of order from the IQ 506 may also comprise loads and stores. When loads and stores are issued out of order from the IQ 506, there are memory dependencies between them that need to be resolved before those instructions can be committed. Accordingly, the load and stores instructions are stored in a Load Store Queue (LSQ) 516 while the dependencies between them are resolved with the help of ROB 508 before their resulting values can be committed to memory 518.

Figure 6:
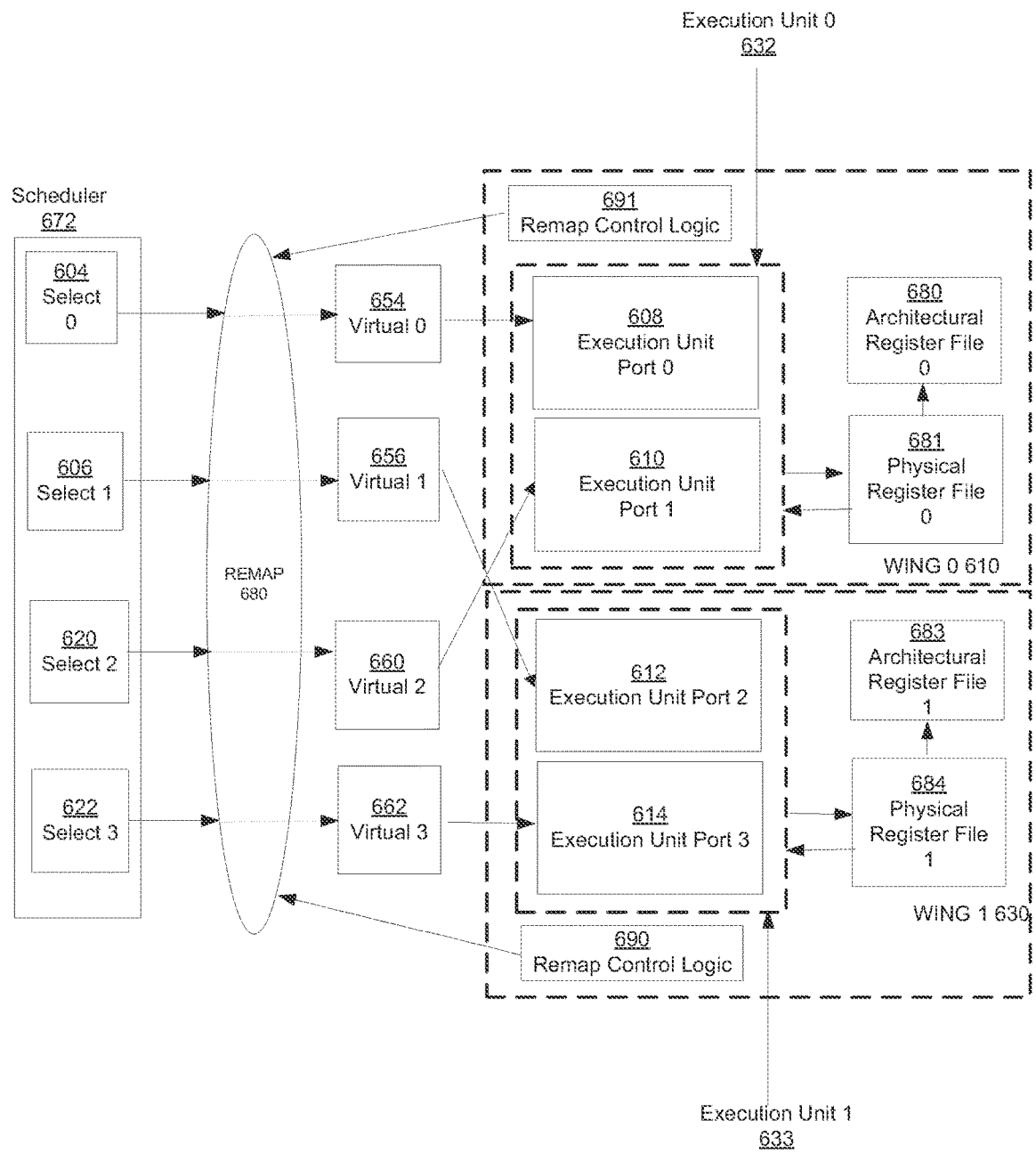
FIG. 6 illustrates a dynamic port remapping technique in accordance with one embodiment of the present invention.

FIG. 6 illustrates a dynamic port remapping technique in accordance with one embodiment of the present invention. While the embodiment illustrated in FIG. 6 can only select 4 instructions at a time, the invention is not so limited. In other embodiments, a scheduler can be configured to comprise as many select ports as required. In the embodiment illustrated in FIG. 6, Scheduler 672 comprises 4 select ports, select port 0 604, select port 1 606, select port 2 620, and select port 3 622.

Remap logic 680 maps the select ports onto virtual execution ports, wherein the mapping is dependent on the busy status of the physical register files in the respective wings. In other words, the mapping is not completely randomized. If the physical register files in the respective wings are not full, then select port 0 604 will map to virtual execution port 0 654, select port 1 606 will map to virtual execution port 1 656, select port 2 620 will map to virtual execution port 2 660, and select port 3 622 will map to virtual execution port 3 662. Further, select port 0 604, in one embodiment, can be configured to pick the oldest or highest priority instruction for dispatching with the remaining ports selecting instructions in order of decreasing age or priority. Accordingly, for example, the highest priority or oldest instruction will always be picked by select port 0 and mapped to execution unit port 0, unless Physical Register File 0 is full, in which case remap logic 680 may need to remap it to a different execution port. The remapping scheme will be explained further below in conjunction with FIG. 7.

Virtual port 0 654, in one embodiment, connects to execution unit port 0 608 in Execution Unit 0 632, while virtual port 1 656 connects to execution unit port 2 612 in Execution Unit 1 633. Similarly, virtual port 2 660, in one embodiment, connects to execution unit port 1 610 in Execution Unit 0 632, while virtual port 3 662 connects to execution unit port 3 614 in Execution Unit 1 633. Virtual port 1 and virtual port 2 are cross-linked to Wing 1 630 and Wing 0 610 respectively for load-balancing reasons as explained above. In one embodiment, the circuitry for remap logic 680 and the virtual ports resides in scheduler 672.

Execution Unit 0 632 writes its output to Physical Register File 0 681, and instructions are committed out of the Physical Register File 0 681 to Architectural Register File 0 680. Similarly, Execution Unit 1 633 writes its output to Physical Register File 1 684, and instructions are committed out of the Physical Register File 1 684 to Architectural Register File 1 683. Remap Control Logic 691 and Remap Control Logic 690, for their respective wings, perform calculations to determine how many instructions can be supported on the current dispatch cycle and feed that information back to the remap logic circuitry 680. Based on the forward looking ability then, the remap logic circuitry 680 can determine if the ports need to be renamed or not. The remap control logic modules, therefore, keep track of the instructions in the pipeline and can, as a result, calculate if there will be enough room in the respective physical register file to support the instructions being dispatched in the current cycle.

Upon receiving feedback from the remap control logic modules, remap logic circuitry 680 determines if remapping will be required. Further, remap logic circuitry 680 determines if remapping is required in parallel with the select logic within the select ports of the scheduler and, thus, the remap logic is completely hidden in the timing path. Accordingly, by the time the selected instructions get to the remap logic circuitry 680, the logic has already made a decision as to whether the instructions will need to be remapped to different execution ports or not.

In one embodiment, remapping can be performed by port renaming Virtual ports can be renamed so as to connect select ports to different physical execution units. Accordingly, instructions from the physical select ports are routed to the execution units in accordance with the renaming scheme.

Figure 7:
FIG. 7 illustrates a table showing an exemplary dynamic port remapping scheme when a physical register file is full in accordance with one embodiment of the present invention.

FIG. 7 illustrates a table showing an exemplary dynamic port remapping scheme when a physical register file is full in accordance with one embodiment of the present invention. As discussed above, remap logic 680 detects, for example, whether Physical Register File 0 681 is full and remaps the virtual ports accordingly. Table 710 illustrates how remapping takes place during one exemplary cycle when Physical Register File 0 681.

When Physical Register File 0 681 is not full, then select port 0 604 will be mapped onto execution unit port 0 608 as shown in Column B of Row 774. Further, select port 1 606 will map to execution unit port 2 612 because barring any remapping, select port 1 606 will map to virtual port 1 656, which in turn connects to execution unit port 2 612. Similarly select port 2 620 will map to execution unit port 1 610. Finally, select port 3 622 will map to execution unit port 3 614.

When Physical Register File 0 681 is full, however, then remap logic 680 needs to remap the select ports to different execution ports. For example, remap logic 680 will map select port 0 604 to virtual port 1 656 which connects to execution unit port 2 612 in Wing 1 630. Because Physical Register File 1 684 is not busy, this remapping will allow the high priority instruction selected by select port 0 604 to be executed in a different wing instead of resulting in deadlock while waiting for Physical Register File 0 681 to free up. However, because select port 0 604 now maps to execution unit port 2 612, select port 1 606, which ordinarily maps to execution unit port 2 612 will need to be disabled. This is shown in Column C of Row 774 in FIG. 710.

Also, because Physical Register File 0 681 is full, select port 2 620 which ordinarily maps to execution unit port 1 610 in Wing 0 610 will need to be remapped. Accordingly, as shown in Row 776, select port 2 620 is remapped to virtual port 3 662, which connects to execution unit port 3 614 in Wing 1 630. Finally, because select port 2 620 now maps to execution unit port 3 614, select port 3 622 will need to be disabled to avoid interference. As a result of this scheme, the higher priority instructions selected will be remapped to execution units in wings where the physical register file is not occupied. This prevents deadlock and balances the loads equally between the two wings.

Figure 8:
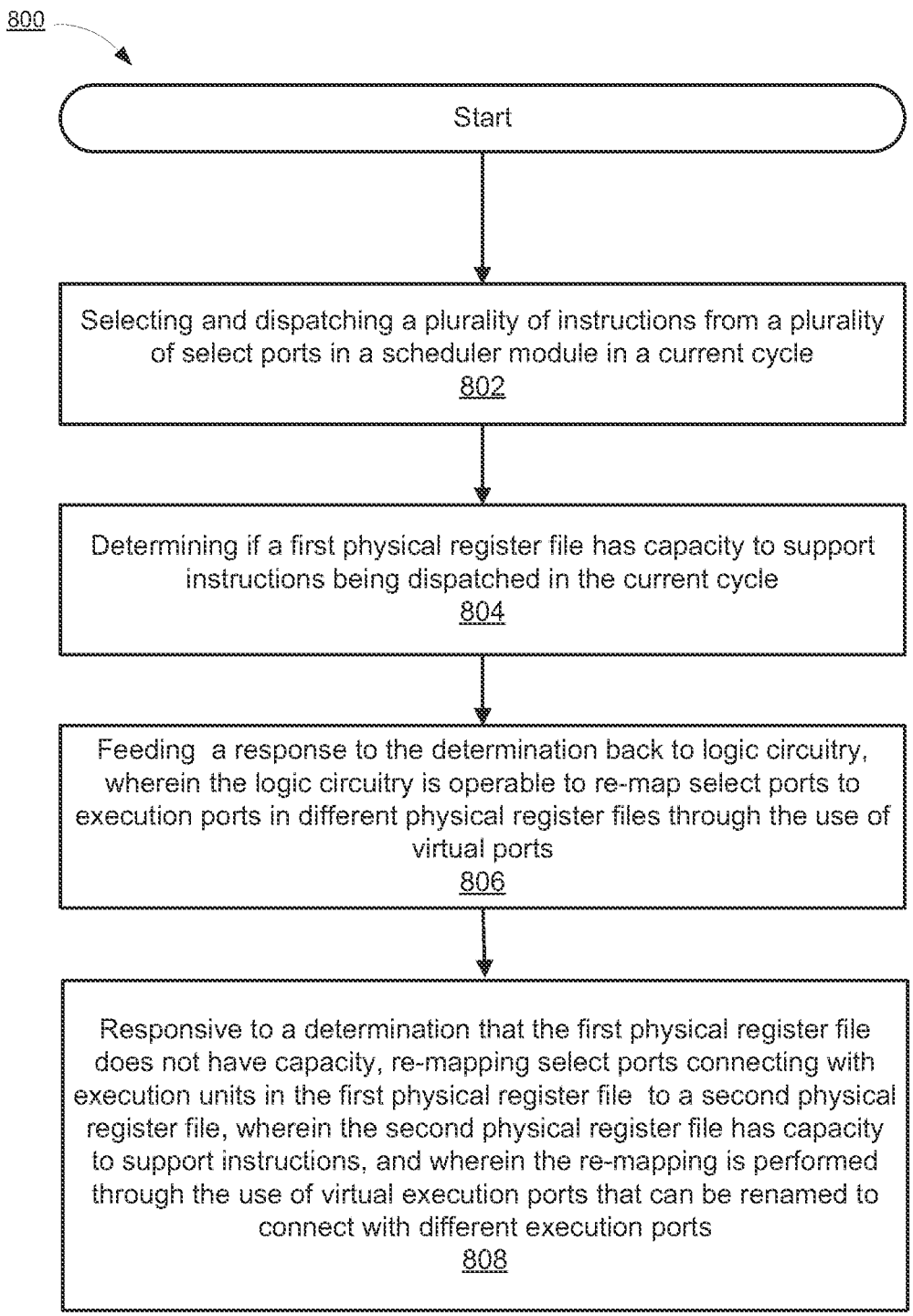
FIG. 8 depicts a flowchart for an exemplary computer controlled process for performing dynamic port remapping during instruction scheduling in an out of order microarchitecture in accordance with embodiments of the present invention.

FIG. 8 depicts a flowchart for an exemplary computer controlled process for performing dynamic port remapping during instruction scheduling in an out of order microarchitecture in accordance with embodiments of the present invention.

At step 802, a plurality of instructions, e.g., 4 as shown in FIG. 6 are selected and dispatched from a plurality of respective select ports in a scheduler module in a current cycle.

At step 804, remap control logic, e.g., module 691 shown in FIG. 6 in the physical register unit determines if a first physical register file will have capacity to support instructions being dispatched in a current cycle by performing calculations based on number of instructions currently in the pipeline.

At step 806, a result of the determining is fed from the remap control logic back to logic circuitry, wherein the logic circuitry is operable to re-map select ports associated with a busy physical register file to execution ports in a different physical register file through the use of virtual ports.

Finally, at step 806, responsive a determination that the first physical register file does not have capacity, re-mapping select ports associated with execution units the first physical register file to a second physical register file, wherein the second physical register file has the capacity to support instructions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for performing dynamic port remapping during instruction scheduling in an out of order microprocessor, said method comprising:
   selecting and dispatching a plurality of instructions from a plurality of select ports in a scheduler module of the microprocessor in a first clock cycle;
   determining if a first physical register file unit has capacity to support instructions dispatched in said first clock cycle;
   supplying a response to said determining to logic circuitry coupled between said plurality of select ports and a plurality of execution ports of a plurality of execution units of the microprocessor, wherein said logic circuitry is operable to re-map select ports in said scheduler module to execution ports based on said response; and
   responsive to a determination that said first physical register file unit is full, re-mapping at least one select port connected with a first execution port of a first execution unit associated with said first physical register file unit to a second execution port of a second execution unit associated with a second physical register file unit, wherein said second physical register file unit has capacity to support an instruction dispatched from said at least one select port.

2. The method of claim 1, wherein said re-mapping is performed by virtual execution ports, wherein said plurality of select ports couple with said plurality of execution ports through a plurality of virtual execution ports, wherein each of said plurality of virtual execution ports can be renamed to route instructions from a select port to a different one of said plurality of execution ports.

3. The method of claim 1, further comprising:
   responsive to a determination that said first physical register file unit has capacity, coupling said plurality of select ports to said plurality of execution ports using a default mapping.

4. The method of claim 1, further comprising:
   responsive to a determination that said first physical register file unit is full, disabling at least one select port in said scheduler module.

5. The method of claim 1, wherein said first physical register file unit and said second physical register file unit are part of a distributed physical register file.

6. The method of claim 1, wherein said at least one select port is configured to select an instruction selected from the group consisting of: oldest and highest priority.

7. The method of claim 1, wherein said determining is performed by circuitry operable to calculate if said first physical register file unit has capacity for instructions dispatched in said first clock cycle based on a number of instructions in a pipeline for said out of order microprocessor during said first clock cycle.

8. An out of order processor configured to perform a method for performing dynamic port remapping during instruction scheduling, said method comprising:
   selecting and dispatching a plurality of instructions from a plurality of select ports in a scheduler module of the microprocessor in a first clock cycle;
   determining if a first physical register file unit has capacity to support instructions dispatched in said first clock cycle;
   supplying a response to said determining to logic circuitry coupled between said plurality of select ports and a plurality of execution ports of a plurality of execution units of the microprocessor, wherein said logic circuitry is operable to re-map select ports in said scheduler module to execution ports based on said response; and
   responsive to a determination that said first physical register file unit is full, re-mapping at least one select port connected with a first execution port of a first execution unit associated with said first physical register file unit to a second execution port of a second execution unit associated with a second physical register file unit, wherein said second physical register file unit has capacity to support an instruction dispatched from said at least one select port.

9. The processor of claim 8, wherein said re-mapping is performed by virtual execution ports, wherein said plurality of select ports couple with said plurality of execution ports through a plurality of virtual execution ports, wherein each of said plurality of virtual execution ports can be renamed to route instructions from a select port to a different one of said plurality of execution ports.

10. The processor of claim 8, wherein said method further comprises:

responsive to a determination that said first physical register file unit has capacity, connecting said plurality of select ports to said plurality of execution ports using a default mapping.

11. The processor of claim 8, wherein said method further comprises:
responsive to a determination that said first physical register file unit is full, disabling at least one select port in said scheduler module.

12. The processor of claim 8, wherein said first physical register file unit and said second physical register file unit are part of a distributed physical register file.

13. The processor of claim 8, wherein said at least one select port is configured to select an instruction selected from the group consisting of: oldest and highest priority.

14. The processor of claim 8, wherein said determining is performed by circuitry operable to calculate if said first physical register file unit has capacity for instructions dispatched in said first clock cycle based on a number of instructions in a pipeline for said out of order processor during said first clock cycle.

15. An apparatus for performing dynamic port remapping during instruction scheduling in an out of order microprocessor, said apparatus comprising:
a memory;
a processor communicatively coupled to said memory, wherein said processor is configured to process instructions out of order, and further wherein said processor is configured to:
select and dispatch a plurality of instructions from a plurality of select ports in a scheduler module of the microprocessor in a first clock cycle;
determine if a first physical register file unit has capacity to support instructions dispatched in said first clock cycle;
supply a response regarding a determination of whether said first physical register file unit has capacity to logic circuitry coupled between said plurality of select ports and a plurality of execution ports of a plurality of execution units of the microprocessor, wherein said logic circuitry is operable to re-map select ports in said scheduler module to execution ports based on said response; and
responsive to a determination that said first physical register file unit is full, re-map at least one select port connected with a first execution port of a first execution unit associated with said first physical register file unit to a second execution port of a second execution unit associated with a second physical register file unit, wherein said second physical register file unit has capacity to support an instruction dispatched from said at least one select port.

16. The apparatus of claim 15, wherein said re-mapping is performed by virtual execution ports, wherein said plurality of select ports connect with said plurality of execution ports through a plurality of virtual execution ports, wherein each of said plurality of virtual execution ports can be renamed to route instructions from a select port to a different one of said plurality of execution ports.

17. The apparatus of claim 15, wherein said processor is further configured to:
couple said plurality of select ports to said plurality of execution ports using a default mapping responsive to a determination that said first physical register file unit has capacity.

18. The apparatus of claim 15, wherein said processor is further configured to:
disable at least one select port in said scheduler module, responsive to a determination that said first physical register file unit is full.

19. The apparatus of claim 15, wherein said first physical register file unit and said second physical register file unit are part of a distributed physical register file.

20. The apparatus of claim 15, wherein said at least one select port is configured to select an instruction selected from the group consisting of: oldest and highest priority.

* * * * *